(12) United States Patent
Yao et al.

(10) Patent No.: US 12,072,949 B2
(45) Date of Patent: Aug. 27, 2024

(54) WEBPAGE SCORING METHOD USED WITH SEARCH ENGINE AND ELECTRONIC DEVICE

(71) Applicant: Acer Incorporated, New Taipei (TW)

(72) Inventors: Sheng-Hsiung Yao, New Taipei (TW); Ling-Fan Tsao, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/075,428

(22) Filed: Dec. 6, 2022

(65) Prior Publication Data

US 2024/0037169 A1 Feb. 1, 2024

(30) Foreign Application Priority Data

Aug. 1, 2022 (TW) ................................ 111128847

(51) Int. Cl.
*G06F 16/957* (2019.01)
*G06Q 30/018* (2023.01)

(52) U.S. Cl.
CPC ....... *G06F 16/9577* (2019.01); *G06Q 30/018* (2013.01)

(58) Field of Classification Search
CPC ............. G06F 16/9577; G06F 16/9535; G06F 16/248; G06Q 30/018

USPC .......................... 707/706, 722, 723, 748, 749
See application file for complete search history.

(56) References Cited

U.S. PATENT DOCUMENTS

| | | | |
|---|---|---|---|
| 8,732,017 B2 | 5/2014 | Attenberg et al. | |
| 2013/0239212 A1* | 9/2013 | Bennett | H04L 63/1441 726/22 |
| 2014/0282917 A1* | 9/2014 | Peckover | H04L 63/10 726/4 |
| 2021/0248624 A1* | 8/2021 | Keren | G06Q 50/184 |
| 2022/0012167 A1* | 1/2022 | Verma | G06N 20/00 |

FOREIGN PATENT DOCUMENTS

| | | |
|---|---|---|
| CN | 101872354 | 10/2010 |
| CN | 104137128 | 12/2018 |

* cited by examiner

*Primary Examiner* — Phong H Nguyen
(74) *Attorney, Agent, or Firm* — JCIPRNET

(57) ABSTRACT

A webpage scoring method used with a search engine and an electronic device are disclosed. The method includes: analyzing a webpage content of a target webpage to obtain environmental rating information corresponding to the target webpage; performing a keyword search by the search engine; and presenting a search result related to the target webpage with the environmental rating information in a window interface.

10 Claims, 4 Drawing Sheets

Analyze the webpage content of the target webpage to obtain the environmental rating information corresponding to the target webpage — S301

Perform a keyword search by the search engine — S302

Present the search result related to the target webpage with the environmental rating information in the window interface — S303

WEBPAGE SCORING METHOD USED WITH SEARCH ENGINE AND ELECTRONIC DEVICE

CROSS-REFERENCE TO RELATED APPLICATION

This application claims the priority benefit of Taiwan application serial no. 111128847, filed on Aug. 1, 2022. The entirety of the above-mentioned patent application is hereby incorporated by reference herein and made a part of this specification.

BACKGROUND

Technical Field

The disclosure relates to a webpage scoring technology, and particularly relates to a webpage scoring method used with a search engine and an electronic device.

Description of Related Art

Environmental awareness is growing among people, and the concepts of environmental protection gradually affect various aspects of our life such as food, clothing, housing, and transportation. For example, when people dine out or go shopping, they tend to choose stores that are environmentally conscious. However, the current mainstream search engines (for example, Google Search) do not provide rating information for the environmental protection policies of different stores.

SUMMARY

The disclosure provides a webpage scoring method used with a search engine and an electronic device.

An embodiment of the disclosure provides a webpage scoring method used with a search engine, which includes: analyzing a webpage content of a target webpage to obtain environmental rating information corresponding to the target webpage; performing a keyword search by the search engine; and presenting a search result related to the target webpage with the environmental rating information in a window interface.

Another embodiment of the disclosure provides an electronic device, which includes a display, a storage circuit, and a processor. The storage circuit is configured to store a search engine. The processor is coupled to the display and the storage circuit. The processor is configured to: analyze a webpage content of a target webpage to obtain environmental rating information corresponding to the target webpage; perform a keyword search by the search engine; and present a search result related to the target webpage with the environmental rating information in a window interface of the display.

Based on the above, after obtaining the environmental rating information corresponding to the target webpage and performing the keyword search by the search engine, the search result related to the target webpage can be presented with the environmental rating information in the window interface. Accordingly, the user can obtain the environmental rating information corresponding to the target webpage during the process of performing the keyword search by the search engine of the electronic device, thereby improving the convenience of use.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
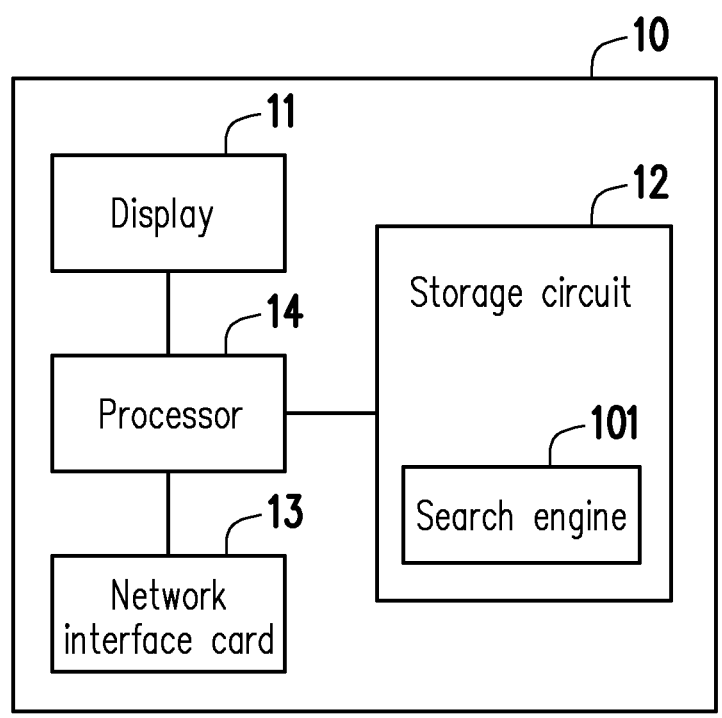
FIG. 1 is a schematic diagram of an electronic device according to an embodiment of the disclosure.

FIG. 1 is a schematic diagram of an electronic device according to an embodiment of the disclosure.

Referring to FIG. 1, the electronic device 10 may be various electronic devices with data processing and networking functions such as a smart phone, a tablet computer, a notebook computer, a desktop computer, an industrial computer, a car computer, a server, and a game console, but the type of the electronic device 10 is not limited thereto.

The electronic device 10 includes a display 11, a storage circuit 12, a network interface card 13, and a processor 14. The display 11 is configured to display images. For example, the display 11 may include a plasma display, a liquid-crystal display (LCD), a thin film transistor liquid crystal display (TFT-LCD), an organic light-emitting diode display (OLED display), and a light-emitting diode display (LED display), but the type of the display 11 is not limited thereto.

The storage circuit 12 is configured to store data. For example, the storage circuit 12 may include a volatile storage circuit and a non-volatile storage circuit. The volatile storage circuit is used for volatile storage of data. For example, the volatile storage circuit may include a random access memory (RAM) or similar volatile storage media. The non-volatile storage circuit is used for non-volatile storage of data. For example, the non-volatile storage circuit may include a read only memory (ROM), a solid state disk (SSD), a traditional hard disk drive (HDD), a flash memory, an embedded multimedia card (eMMC), a universal flash storage (UFS) device or similar non-volatile storage media.

The network interface card 13 may be used to perform a wired and/or wireless communication function. For example, the network interface card 13 may include a wired and/or wireless communication circuit to perform the wired and/or wireless communication function. The network interface card 13 may be used to connect the electronic device 10 to the Internet, so as to upload information from the electronic device 10 to the Internet or download information from the Internet to the electronic device 10. In addition, the network interface card 13 may support wired communication protocols such as Ethernet and/or wireless communication protocols such as WiFi, fourth-generation wireless communication technology (4G), fifth-generation wireless communication technology (5G), and Bluetooth.

The processor 14 is coupled to the display 11, the storage circuit 12, and the network interface card 13. The processor 14 may be responsible for the whole or part of the operation of the electronic device 10. For example, the processor 14 may include a central processing unit (CPU) or other programmable general-purpose or special-purpose microprocessors, a digital signal processor (DSP), a programmable controller, an application specific integrated circuit (ASIC), a programmable logic device (PLD), other similar devices, or a combination of these devices.

In one embodiment, the processor 14 may download the webpage content of one or more webpages from the Internet via the network interface card 13. The processor 14 may analyze (for example, scan) the webpage content of the downloaded webpage (also referred to as a target webpage). For example, the processor 14 may analyze the webpage content of the target webpage by a preset rule and/or an artificial intelligence (AI) model. The processor 14 may obtain environmental rating information corresponding to the target webpage according to the analysis result of the target webpage.

In one embodiment, the environmental rating information may reflect the degree of association between the information described in the webpage content of the target webpage and environmental protection. For example, the environmental protection may include environmental issues such as environmental conservation and sustainable development of the environment.

In one embodiment, the degree of association between the information described in the webpage content of the target webpage and environmental protection may be evaluated based on a keyword and/or a sentence related to environmental protection presented in the webpage content. The greater the total number of keywords and/or sentences related to environmental protection presented in the webpage content of the target webpage, the higher the degree of association between the information described in the webpage content of the target webpage and environmental protection. For example, the keyword related to environmental protection may include but not limited to "environmental conservation," "energy saving and carbon reduction," and "renewable energy." In addition, the sentence related to environmental protection may include but not limited to "do not use plastic bags," "use environmentally friendly materials," "provide recycling services," and "provide vegetable food."

In one embodiment, the processor 14 may detect an environmental feature in the webpage content of the target webpage. For example, the environmental feature may include the keyword related to environmental protection (such as environmental conservation, energy saving and carbon reduction, and renewable energy) and/or the sentence related to environmental protection (such as do not use plastic bags, use environmentally friendly materials, provide recycling services, and provide vegetable food). The processor 14 may obtain the environmental rating information corresponding to the target webpage according to the environmental feature in the webpage content of the target webpage. For example, the processor 14 may count the total number of the detected one or more environmental features and determine the environmental rating information corresponding to the target webpage according to the total number.

In one embodiment, the environmental rating information may also reflect the degree of energy consumption of user equipment (for example, remote equipment) for presenting the webpage content of the target webpage. For example, the degree of energy consumption may be evaluated based on the network traffic required by the user equipment to read the webpage content of the target webpage, the code used by the webpage content of the target webpage, and/or the multimedia file included in the webpage content of the target webpage. The greater the network traffic required by the user equipment to read the webpage content of the target webpage, the more codes (or the more complex) the webpage content of the target webpage uses and/or the larger the file size of the multimedia file included in the webpage content of the target webpage, which means that the degree of energy consumption of the user equipment for presenting the webpage content of the target webpage is also higher.

In one embodiment, the processor 14 may analyze the network traffic required by the user equipment to read the webpage content of the target webpage, the code used by the webpage content of the target webpage, and/or the multimedia file included in the webpage content of the target webpage to obtain the energy consumption feature corresponding to the target webpage. For example, the processor 14 may use the electronic device 10 itself as the user equipment and analyze the network traffic required by the user equipment (that is, the electronic device 10) to read the webpage content of the target webpage from the remote server.

In one embodiment, the energy consumption feature may include the network traffic required by the user equipment (such as the electronic device 10) to read the webpage content of the target webpage from the remote server, the total number of codes (such as Java script) included in the target webpage, the total number of images in the target webpage, the file size of each image in the target webpage, the total number of videos in the target webpage, the file size of each video in the target webpage, whether duplicate codes exist in the target webpage, and/or the total number of duplicate codes in the target webpage. Then, the processor 14 may obtain the environmental rating information corresponding to the target webpage according to the energy consumption feature. For example, the processor 14 may count the total number of the detected one or more energy consumption features and determine the environmental rating information corresponding to the target webpage according to the total number.

In one embodiment, the processor 14 may preset a plurality of scoring items, as shown in Table 1 below. Each scoring item may correspond to one environmental feature or energy consumption feature. The processor 14 may determine and obtain the environmental rating information corresponding to the target webpage with reference to the scoring items.

TABLE 1

| Scoring item | Explanation | Score |
| --- | --- | --- |
| Keyword | Such as environmental conservation, energy saving and carbon reduction, and renewable energy | Add 5 points for each keyword |
| Sentence | Such as do not use plastic bags, use environmentally friendly materials, provide recycling services, and provide vegetable food | Add 10 points for each sentence |
| Network traffic required by the user equipment to read the | Greater network traffic means more energy consumption | Add 10 points for less than 5 MB |

TABLE 1-continued

| Scoring item | Explanation | Score |
| --- | --- | --- |
| webpage content of the target webpage | | Add 5 points for between 5 MB and 10 MB |
| Total number of codes (such as Java script) included in the target webpage | More Java scripts mean more energy consumption | Add 5 points for less than 3 Deduct 5 points for more than 10 |
| File size of each image in the target webpage | Larger file size of the image means more energy consumption | Deduct 3 points if an image exceeds 200 KB |
| Total number of videos in the target webpage | More videos mean more energy consumption | Deduct 5 points for a video |
| Total number of duplicate codes in the target webpage | Duplicate codes lead to unnecessary energy consumption | Deduct 5 points for a set of duplicate codes |

In one embodiment, it is assumed that the target webpage includes two keywords (2×5=+10) related to environmental protection and one sentence (+10) related to environmental protection, the network traffic required by the user equipment to read the webpage content of the target webpage is less than 5 MB (+10), and the target webpage includes one image (−3) exceeding 200 KB. Then, the processor 14 may refer to the scoring items in Table 1 and determine the environmental score corresponding to the target webpage as 27 points (that is, 27=2×5+10+10−3). In one embodiment, the environmental rating information corresponding to the target webpage may include the environmental score. However, for different target webpages, the environmental score determined by the processor 14 may be different. In addition, each scoring item listed in Table 1 may be adjusted according to practical needs, and the disclosure is not limited thereto.

In one embodiment, the processor 14 may convert the environmental score corresponding to the target webpage into an environmental level. For example, the processor 14 may refer to Table 2 below to determine the environmental level (that is, Eco level) corresponding to the target webpage. Specifically, the higher the environmental score corresponding to the target webpage is, the higher the environmental level corresponding to the target webpage is.

TABLE 2

| Score interval | Less than 9 points | 10 to 19 points | 20 to 39 points | 40 points or more |
| --- | --- | --- | --- | --- |
| Eco level | N/A | Eco 3 | Eco 2 | Eco 1 |

Further to the above example, assuming that the environmental score corresponding to the target webpage is 27 points, the processor 14 may refer to Table 2 above and determine the environmental level corresponding to the target webpage as "Eco 2." In one embodiment, the environmental rating information corresponding to the target webpage may include the environmental level. By presenting the environmental rating information corresponding to the target webpage using the environmental level, the user can easily know the level of environmental protection and/or the degree of energy consumption of the target webpage.

In one embodiment, the storage circuit 12 stores a search engine 101. The search engine 101 may be integrated with a browser program or independent of the browser program. For example, the search engine 101 may include search engines such as Google Search of Google and Bing of Microsoft, and the disclosure is not intended to limit the type of the search engine 101. The processor 14 may perform a keyword search by the search engine 101. Then, the processor 14 may present a search result related to the target webpage with the environmental rating information in a window interface of the display 11 (or the browser program).

Figure 2:
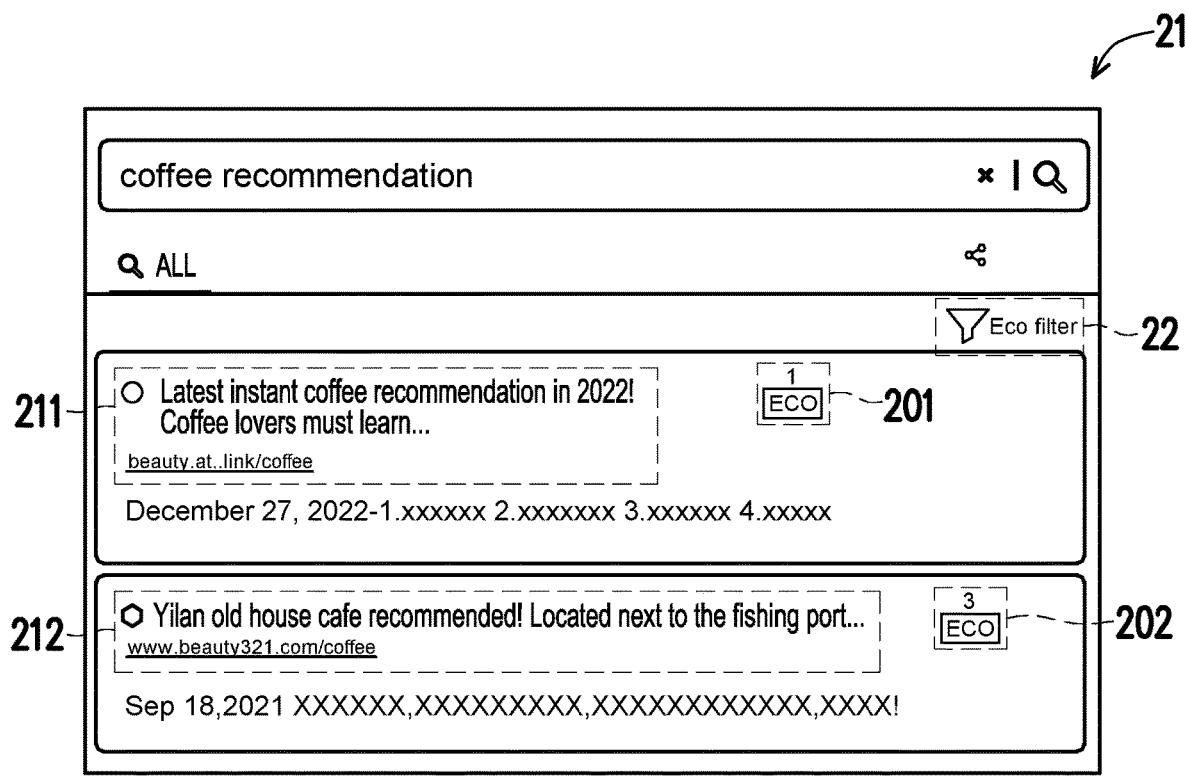
FIG. 2 is a schematic diagram of presenting a search result related to a target webpage with environmental rating information in a window interface according to an embodiment of the disclosure.

FIG. 2 is a schematic diagram of presenting the search result related to the target webpage with the environmental rating information in the window interface according to an embodiment of the disclosure.

Referring to FIG. 1 and FIG. 2, it is assumed that the search keywords input by the user are "coffee" and "recommendation." The processor 14 may instruct the search engine 101 to perform a keyword search according to the search keywords. According to the result of the keyword search, the processor 14 may instruct the display 11 to present the search result related to the target webpage in the window interface 21 together with the environmental rating information. For example, it is assumed that the search engine 101 generates multiple search results according to the search keywords of "coffee" and "recommendation," and each search result corresponds to one webpage (that is, target webpage) that can be accessed through the Internet.

In the window interface 21, the environmental rating information 201 and 202 may be presented near the search results 211 and 212 respectively to reflect the environmental levels of the webpages respectively corresponding to the search results 211 and 212. For example, the environmental rating information 201 and 202 may reflect that the environmental levels of the webpages corresponding to the search results 211 and 212 are "Eco 1" and "Eco 3," respectively. It should be noted that the display position and display form of the environmental rating information corresponding to each search result may be adjusted according to practical needs, and the disclosure is not limited thereto.

In one embodiment, the processor 14 may further sort the search result according to the environmental rating information corresponding to each search result, so that the sorted search result is positively related to the environmental rating information thereof. Taking FIG. 2 as an example, the environmental level of the search result 211 (that is, "Eco 1") is higher than the environmental level of the search result 212 (that is, "Eco 3"). Therefore, after the search results 211 and 212 are sorted according to the environmental rating information, the search result 211 may be sorted before the search result 212. Accordingly, the user can preferentially see the search result with the higher environmental level in the window interface 21.

In one embodiment, the processor 14 may also present an operable object 22 in the window interface 21. The operable object 22 may be used to control the search engine 101 or the browser program to enable or disable the display of the environmental rating information. For example, in the disabled mode of the environmental rating information (that is, the default display mode of the search engine 101 or the browser program), the environmental rating information 201 and 202 may not be presented in the window interface 21 along with the search results 211 and 212. However, after the user triggers (that is, clicks through a cursor) the operable object 22, the search engine 101 or the browser program can be switched to the enabled mode of the environmental rating information. In the enabled mode of the environmental rating information, the environmental rating information 201 and 202 can be presented in the window interface 21 along with the search results 211 and 212, as shown in FIG. 2. Then, the user may trigger (that is, click through the cursor) the operable object 22 again to disable (or enable) the display of the environmental rating information.

Figure 3:
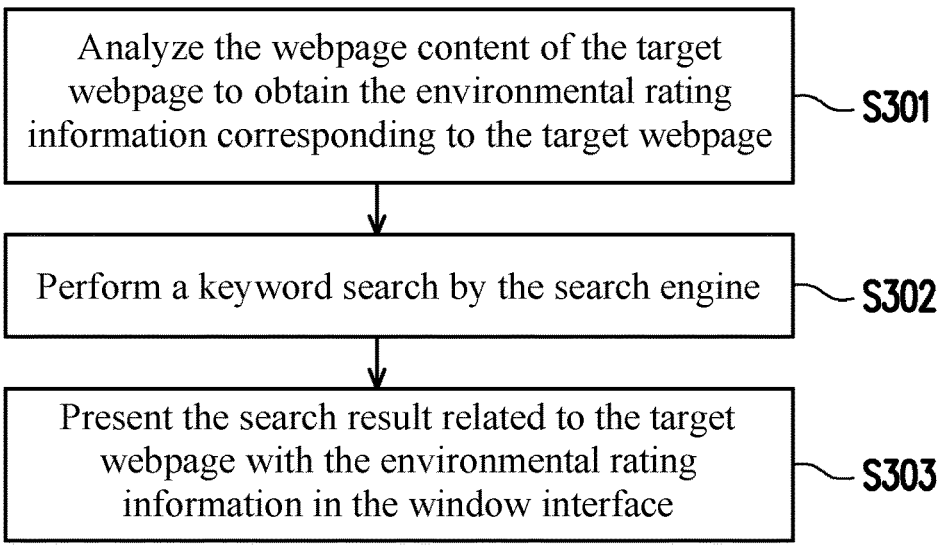
FIG. 3 is a flowchart of a webpage scoring method used with a search engine according to an embodiment of the disclosure.

FIG. 3 is a flowchart of a webpage scoring method used with a search engine according to an embodiment of the disclosure.

Referring to FIG. 3, in step S301, the webpage content of the target webpage is analyzed to obtain the environmental rating information corresponding to the target webpage. In step S302, a keyword search is performed by the search engine. In step S303, the search result related to the target webpage is presented with the environmental rating information in the window interface.

Figure 4:
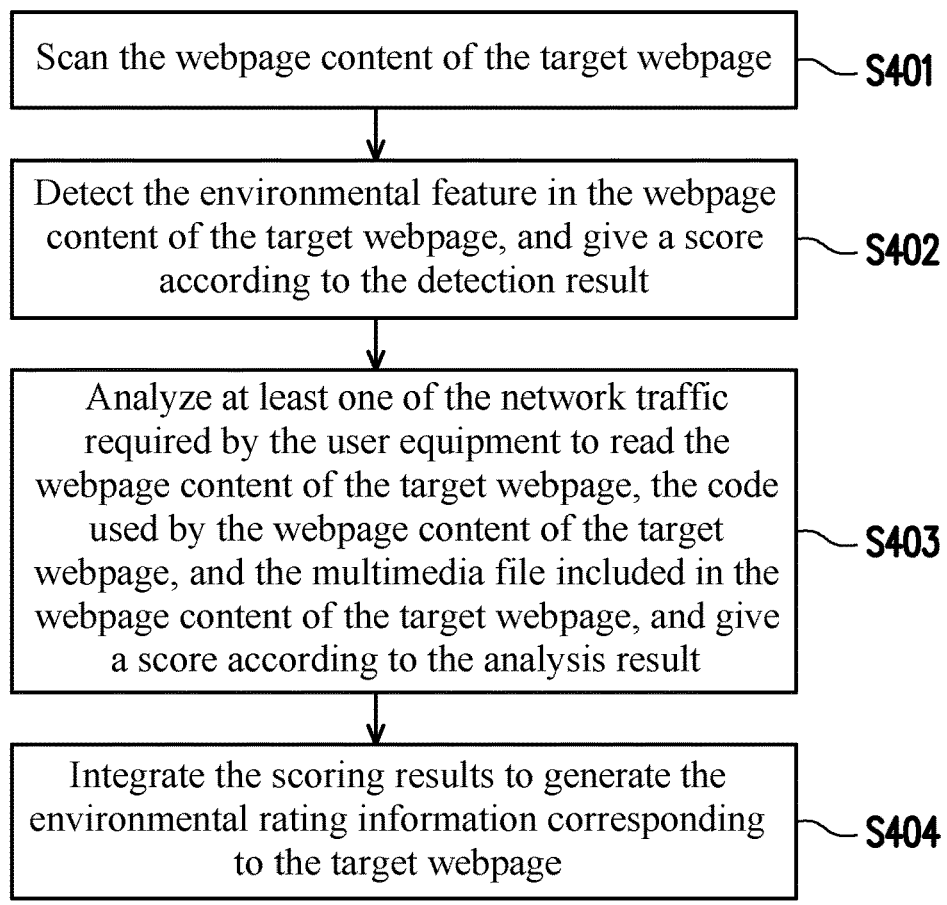
FIG. 4 is a flowchart of a webpage scoring method used with a search engine according to an embodiment of the disclosure.

FIG. 4 is a flowchart of a webpage scoring method used with a search engine according to an embodiment of the disclosure.

Referring to FIG. 4, in step S401, the webpage content of the target webpage is scanned. In step S402, the environmental feature in the webpage content of the target webpage is detected, and a score is given according to the detection result. In step S403, at least one of the network traffic required by the user equipment to read the webpage content of the target webpage, the code used by the webpage content of the target webpage, and the multimedia file included in the webpage content of the target webpage is analyzed, and a score is given according to the analysis result. In step S404, the scoring results of steps S402 and S403 are integrated to generate the environmental rating information corresponding to the target webpage.

Figure 5:
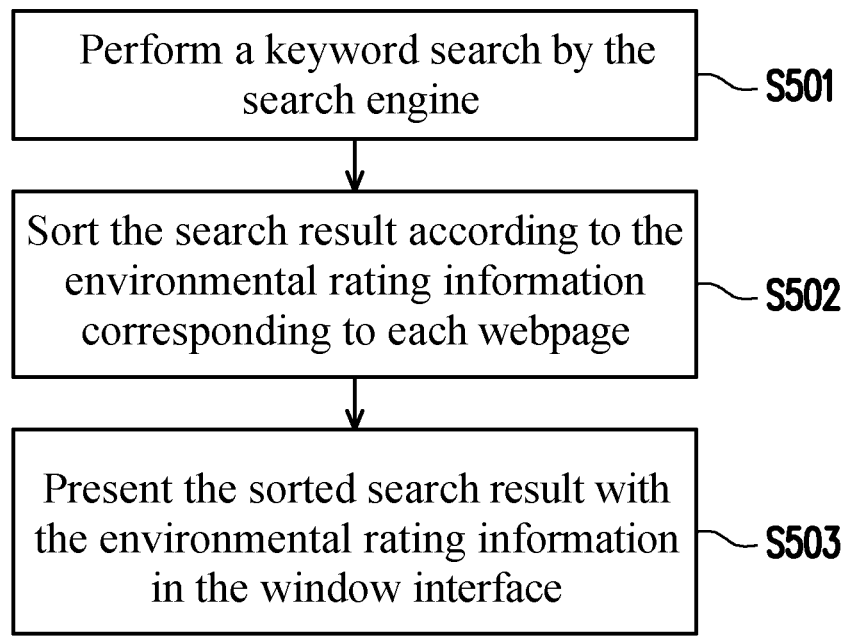
FIG. 5 is a flowchart of a webpage scoring method used with a search engine according to an embodiment of the disclosure.

FIG. 5 is a flowchart of a webpage scoring method used with a search engine according to an embodiment of the disclosure.

Referring to FIG. 5, in step S501, a keyword search is performed by the search engine. In step S502, the search result is sorted according to the environmental rating information corresponding to each webpage. In step S503, the sorted search result is presented with the environmental rating information in the window interface.

Each step in FIG. 3 to FIG. 5 has been described in detail as above, and will not be repeated hereinafter. It should be noted that each step in FIG. 3 to FIG. 5 may be implemented as a plurality of codes or circuits, and the disclosure is not limited thereto. In addition, the methods of FIG. 3 to FIG. 5 may be used in conjunction with the above exemplary embodiment or may be used alone, which is not limited in the disclosure.

To sum up, after obtaining the environmental rating information corresponding to the target webpage and performing the keyword search by the search engine, the search result related to the target webpage can be presented with the environmental rating information in the window interface. Accordingly, the user can obtain the environmental rating information corresponding to the target webpage during the process of performing the keyword search by the search engine of the electronic device, thereby improving the convenience of use. In particular, for users who care about environmental issues, the disclosure effectively improves the user experience of using the search engine to search for required information.

Although the disclosure has been described with reference to the embodiments above, they are not intended to limit the disclosure. Those skilled in the art can make some changes and modifications without departing from the spirit and scope of the disclosure. Therefore, the protection scope of the disclosure should be determined by the appended claims.

What is claimed is:

1. A webpage scoring method used with a search engine, comprising:

evaluating a degree of energy consumption of a user equipment for presenting a webpage content of a target webpage to obtain an energy consumption feature corresponding to the target webpage, wherein the energy consumption feature comprises multiple items among a network traffic required by the user equipment to read the webpage content of the target webpage from a remote server, a total number of codes used by the target webpage, a total number of images in the target webpage, a file size of each image in the target webpage, a total number of videos in the target webpage, a file size of each video in the target webpage, whether duplicate codes exist in the target webpage, and a total number of the duplicate codes in the target webpage;

obtaining environmental rating information corresponding to the target webpage according to the energy consumption feature;

performing a keyword search by the search engine; and presenting a search result related to the target webpage with the environmental rating information in a window interface.

2. The webpage scoring method used with the search engine according to claim 1, wherein the environmental rating information further reflects at least one of a degree of association between information described in the webpage content of the target webpage and environmental protection.

3. The webpage scoring method used with the search engine according to claim 1, further comprising:

detecting an environmental feature in the webpage content of the target webpage, wherein the environmental feature comprises at least one of a keyword and a sentence related to environmental protection; and obtaining the environmental rating information corresponding to the target webpage according to the environmental feature.

4. The webpage scoring method used with the search engine according to claim 1, wherein evaluating the degree of the energy consumption of the user equipment for presenting the webpage content of the target webpage to obtain the energy consumption feature corresponding to the target webpage comprises:

analyzing the network traffic required by the user equipment to read the webpage content of the target webpage, the codes used by the webpage content of the target webpage, and a multimedia file included in the webpage content of the target webpage to evaluate the degree of the energy consumption of the user equipment for presenting the webpage content of the target webpage and obtain the energy consumption feature corresponding to the target webpage.

5. The webpage scoring method used with the search engine according to claim 1, wherein presenting the search result related to the target webpage with the environmental rating information in the window interface comprises:

sorting the search result according to the environmental rating information, so that the search result sorted is positively related to the environmental rating information.

6. An electronic device, comprising:

a display;

a storage circuit configured to store a search engine; and a processor coupled to the display and the storage circuit, wherein the processor is configured to:

evaluate a degree of energy consumption of a user equipment for presenting a webpage content of a target webpage to obtain an energy consumption feature corresponding to the target webpage, wherein the energy consumption feature comprises multiple items among a network traffic required by the user equipment to read the webpage content of the target webpage from a remote server, a total number of codes used by the target webpage, a total number of images in the target webpage, a file size of each image in the target webpage, a total number of videos in the target webpage, a file size of each video in the target webpage, whether duplicate codes exist in the target webpage, and a total number of the duplicate codes in the target webpage;

obtain environmental rating information corresponding to the target webpage according to the energy consumption feature;

perform a keyword search by the search engine; and present a search result related to the target webpage with the environmental rating information in a window interface of the display.

7. The electronic device according to claim 6, wherein the environmental rating information further reflects at least one of a degree of association between information described in the webpage content of the target webpage and environmental protection.

8. The electronic device according to claim 6, wherein the processor is further configured to:

detect an environmental feature in the webpage content of the target webpage, wherein the environmental feature comprises at least one of a keyword and a sentence related to environmental protection; and obtain the environmental rating information corresponding to the target webpage according to a detection result.

9. The electronic device according to claim 6, wherein evaluating the degree of the energy consumption of the user equipment for presenting the webpage content of the target webpage to obtain the energy consumption feature corresponding to the target webpage comprises:

analyzing the network traffic required by user equipment to read the webpage content of the target webpage, the codes used by the webpage content of the target webpage, and a multimedia file included in the webpage content of the target webpage to evaluate the degree of the energy consumption of the user equipment for presenting the webpage content of the target webpage and obtain the energy consumption feature corresponding to the target webpage.

10. The electronic device according to claim 6, wherein presenting the search result related to the target webpage with the environmental rating information in the window interface comprises:

sorting the search result according to the environmental rating information, so that the search result sorted is positively related to the environmental rating information.

* * * * *